US012643675B2

(12) United States Patent
Baderspach et al.

(10) Patent No.: US 12,643,675 B2
(45) Date of Patent: Jun. 2, 2026

(54) ASSEMBLY FOR AN AIRCRAFT, SAID ASSEMBLY HAVING A PYLON AND A RESERVOIR CONTAINING AN EXTINGUISHING AGENT

(71) Applicant: Airbus Operations SAS, Toulouse (FR)

(72) Inventors: Jérôme Baderspach, Toulouse (FR); Jean Geliot, Toulouse (FR); Dimitri Garay, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 258 days.

(21) Appl. No.: 18/627,739

(22) Filed: Apr. 5, 2024

(65) Prior Publication Data

US 2024/0351704 A1      Oct. 24, 2024

(30) Foreign Application Priority Data

Apr. 21, 2023    (FR) ...................................... 2304025

(51) Int. Cl.
| | |
|---|---|
| *B64D 45/00* | (2006.01) |
| *A62C 3/08* | (2006.01) |
| *B64D 29/02* | (2006.01) |
| *F02C 7/25* | (2006.01) |

(52) U.S. Cl.
CPC ............... *B64D 45/00* (2013.01); *A62C 3/08* (2013.01); *B64D 29/02* (2013.01); *F02C 7/25* (2013.01); *B64D 2045/009* (2013.01)

(58) Field of Classification Search
CPC .. B64D 45/00; B64D 2045/009; B64D 29/02; A62C 3/08; F02C 7/25
See application file for complete search history.

(56) References Cited

U.S. PATENT DOCUMENTS

| | | | | |
|---|---|---|---|---|
| 8,800,675 B2 * | 8/2014 | Machado | ............... | A62C 13/78 |
| | | | | 169/53 |
| 11,547,884 B2 * | 1/2023 | Cayssials | ............... | A62C 35/13 |
| 11,975,859 B2 * | 5/2024 | Cayssials | ............ | B64D 27/402 |
| 12,054,271 B2 * | 8/2024 | Alby | .................... | B64D 27/404 |
| 12,312,096 B2 * | 5/2025 | Geliot | ....................... | F02C 7/20 |
| 12,364,632 B2 * | 7/2025 | Geliot | ....................... | B64C 7/02 |
| 12,508,454 B2 * | 12/2025 | Geliot | ..................... | A62C 3/08 |
| 2010/0230122 A1 * | 9/2010 | Machado | ................. | A62C 3/08 |
| | | | | 169/62 |
| 2019/0054332 A1 | 2/2019 | Gilbert et al. | | |

(Continued)

OTHER PUBLICATIONS

French Search Report for corresponding French Patent Application No. 2304025 dated Oct. 31, 2023.

*Primary Examiner* — Philip J Bonzell
(74) *Attorney, Agent, or Firm* — Greer, Burns & Crain, Ltd.

(57) ABSTRACT

An assembly having a pylon with two side walls provided with apertures, a reservoir for extinguishing agent, a support which has two support elements, wherein each support element has an upwardly facing first bearing face to which the reservoir is fastened, a distal end, and a proximal end fastened by a first removable fastener, wherein the distal end is rotatable about a horizontal axis, and wherein each support element is movable between a use position, in which the first bearing face is horizontal, and a fitted position, in which the first bearing face is tilted downwards.

10 Claims, 3 Drawing Sheets

(56)                    References Cited

U.S. PATENT DOCUMENTS

| | | | |
|---|---|---|---|
| 2020/0298036 A1 | 9/2020 | Partridge et al. | |
| 2020/0324154 A1* | 10/2020 | Cayssials | A62C 35/13 |
| 2021/0101694 A1* | 4/2021 | Cayssials | B64D 37/32 |
| 2021/0188457 A1* | 6/2021 | Cayssials | F02C 7/25 |
| 2022/0024599 A1* | 1/2022 | Cayssials | F02C 7/20 |
| 2022/0041293 A1* | 2/2022 | Alby | B64D 27/40 |
| 2023/0000697 A1* | 1/2023 | Geliot | B64C 7/02 |
| 2024/0082611 A1* | 3/2024 | Geliot | B64D 27/40 |
| 2024/0300665 A1* | 9/2024 | Geliot | F02C 7/20 |
| 2024/0417088 A1* | 12/2024 | Deforet | A62C 3/08 |

* cited by examiner

ASSEMBLY FOR AN AIRCRAFT, SAID ASSEMBLY HAVING A PYLON AND A RESERVOIR CONTAINING AN EXTINGUISHING AGENT

CROSS-REFERENCES TO RELATED APPLICATIONS

This application claims the benefit of French Patent Application Number 2304025 filed on Apr. 21, 2023, the entire disclosure of which is incorporated herein by way of reference.

FIELD OF THE INVENTION

The present invention relates to an assembly for an aircraft, said assembly having a pylon and a reservoir containing an extinguishing agent, and to an aircraft having at least one such assembly.

BACKGROUND OF THE INVENTION

An aircraft conventionally has at least one nacelle inside which an engine, for example of the jet engine type, is disposed. The nacelle and the engine are fastened to the structure of the aircraft by means of a pylon fastened beneath the wing of the aircraft.

In order to avoid damaging the structure of the aircraft if the engine catches fire, the aircraft is equipped with a fire-fighting system which has two reservoirs.

FIG. 5 shows an assembly 800 of the prior art which has a pylon 801 and two reservoirs 802 which are installed in the pylon 801 and each contain an extinguishing agent. Each reservoir 802 is spherical in this case and, for each reservoir 802, the pylon 801 has an aperture 804 which passes through a lateral wall of the pylon 801 and through which the reservoir 802 is inserted and fastened inside the pylon 801.

Each reservoir 802 is equipped with a discharge head 806 which has a disc that closes the reservoir 802 and an explosive cartridge which destroys the disc when it is activated. For each reservoir 802, the fire-fighting system also has a discharge pipe 808 which extends inside the pylon 801 between the discharge head 806 and the engine.

The destruction of the disc makes it possible to release the extinguishing agent, which then flows or escapes in the discharge pipe 808 towards the engine.

For environmental reasons, the extinguishing substances currently in use, such as Halon, must be replaced by new extinguishing substances. These new extinguishing substances require a greater volume in order to perform their function and it is therefore necessary to enlarge each reservoir 802.

Each reservoir 802 then becomes heavier and, since the space inside the pylon 801 remains limited, it becomes hard to handle and fit the reservoir 802. It is therefore necessary to find a different installation for improving the existing installation in order to make it easier to fit and remove each reservoir.

SUMMARY OF THE INVENTION

An object of the present invention is to propose an assembly for an aircraft, wherein said assembly has a pylon and at least one reservoir containing an extinguishing agent, and, for the or each reservoir, a system which improves the installation of the reservoir in the pylon.

To that end, what is proposed is an assembly for an aircraft, said assembly having:

a pylon extending along a longitudinal direction and having a chassis and two side walls disposed on either side of the chassis, each provided with an aperture, at least one reservoir, which has fastening means and is intended to contain an extinguishing agent, for each reservoir, a support which has two support elements and is offset along the longitudinal direction with respect to said apertures, wherein each support element has an upwardly facing first bearing face against which the fastening means bear, wherein each support element has a proximal end at said apertures and a distal end on the opposite side to said apertures, wherein each proximal end is fastened to the chassis by at least one first fastening means which ensures removable fastening of said proximal end, wherein each distal end is mounted on the chassis rotatably about a horizontal axis of rotation perpendicular to the longitudinal direction, and wherein each support element can be moved between a use position, in which the associated first bearing face is horizontal, and a fitted position, in which the first bearing face is tilted downwards, for each reservoir and for each support element, fastening elements which fasten the fastening means of said reservoir to said support element.

Such an assembly makes it possible to easily remove and fit the reservoir inside the pylon.

Advantageously, the assembly has, for each support element, a stop against which said support element bears in the fitted position.

Advantageously, each first fastening means takes the form, at the proximal end, of a bolt having a first nut fastened to the chassis and a first clamping screw which is screwed in the first nut through a first bore in the associated support element.

Advantageously, the screw head of each first clamping screw is accessible from the inside of the chassis between the support elements.

Advantageously, the rotation of each support element is realized by the fitting of a second fastening means which takes the form, at the distal end, of a bolt having a second nut fastened to the chassis and a second clamping screw which is screwed in the second nut through a second bore in the support element.

Advantageously, the screw head of each second clamping screw is accessible from the inside of the chassis between the support elements.

Advantageously, the assembly has, at the distal end of each support element, a first fastening means having a bolt with a first nut fastened to the chassis and a first clamping screw which is screwed in the first nut through a first bore in the associated support element.

Advantageously, at each distal end, the first fastening means is disposed below the second fastening means.

Advantageously, each first bearing face is equipped with at least one step arranged such that, in the fitted position, a fastening means is located to the rear of a step in relation to the descending direction of the first bearing face.

The invention also proposes an aircraft having an assembly according to one of the preceding variants.

BRIEF DESCRIPTION OF THE DRAWINGS

The features of the invention that are mentioned above, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
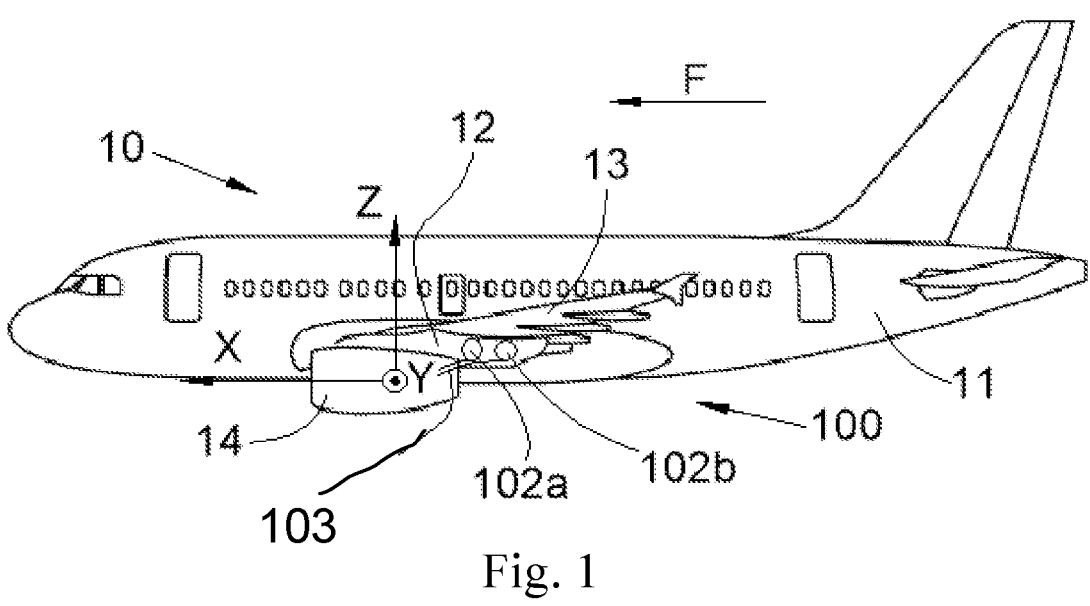
FIG. 1 is a side view of an aircraft according to the invention.

FIG. 1 shows an aircraft 10 which has a fuselage 11, to each side of which is fastened a wing 13 which bears an engine 14, such as a turbofan.

For each engine 14, the aircraft 10 also has a pylon 12 which fastens the engine 14 beneath the wing 13.

In the following description, terms relating to a position are considered in relation to an aircraft in a normal flight position, i.e. as shown in FIG. 1.

In the following description, and by convention, X denotes the longitudinal direction of the pylon which supports the engine and which is parallel to the longitudinal axis of the aircraft and points forwards, Y denotes the transverse direction which is horizontal when the aircraft is on the ground, and Z denotes the vertical direction which is vertical when the aircraft is on the ground, these three directions X, Y and Z being mutually orthogonal.

Moreover, the terms "front" and "rear" are to be considered relative to a direction of forward movement of the aircraft 10 when the engine 14 is operating, this direction being schematically shown by the arrow F.

For each engine 14, the aircraft 10 has a fire-fighting system 100 which has at least one reservoir 102*a-b* filled with an extinguishing agent and, for each reservoir 102*a-b*, a discharge pipe 103 which extends between said reservoir 102*a-b* and the engine 14 supported by said pylon 12.

Like for the prior art, the reservoir 102*a* is equipped with a discharge head which is designed to release the extinguishing agent towards the discharge pipe 103 when required.

Figure 2:
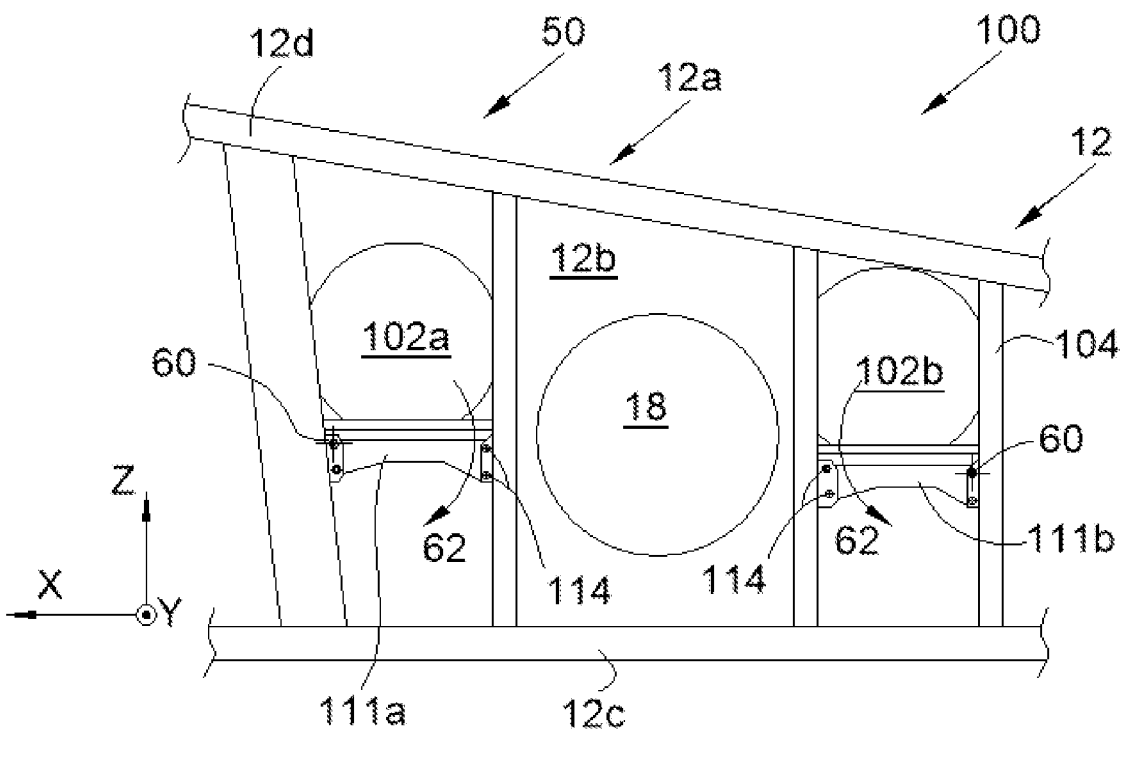
FIG. 2 is a side view of assemblies according to the invention.
Figure 3:
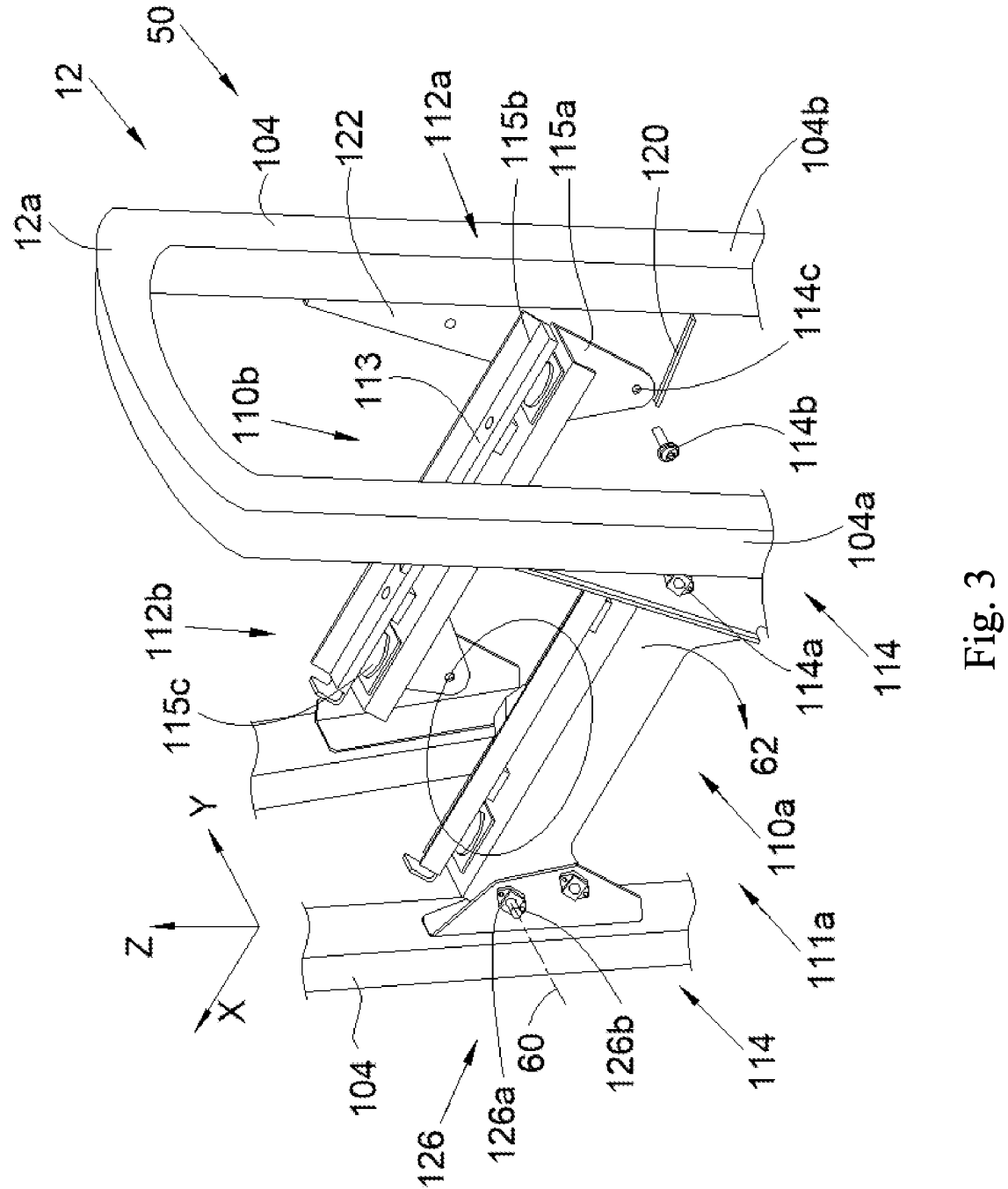
FIG. 3 is a perspective view of an assembly from FIG. 2.
Figure 4:
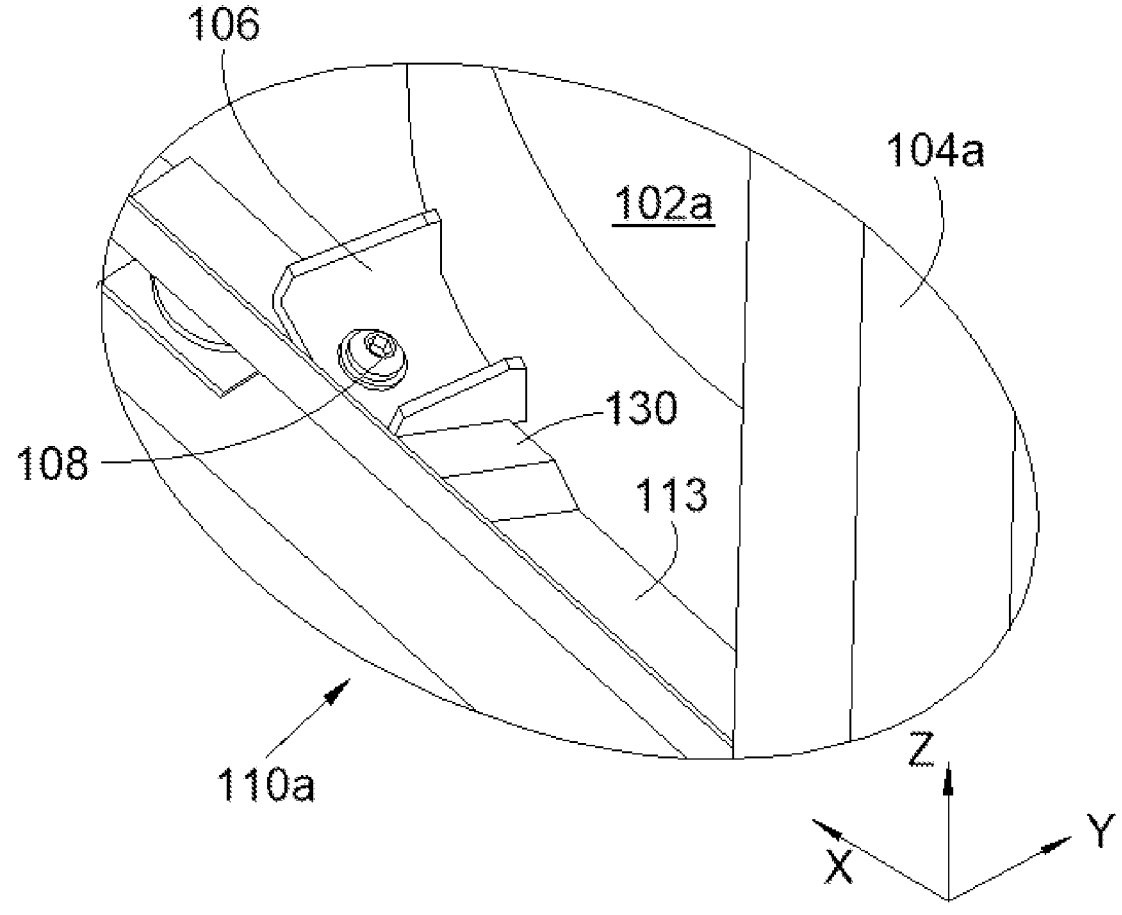
FIG. 4 is a perspective view of a detail for fitting a reservoir on an assembly according to the invention.
Figure 5:
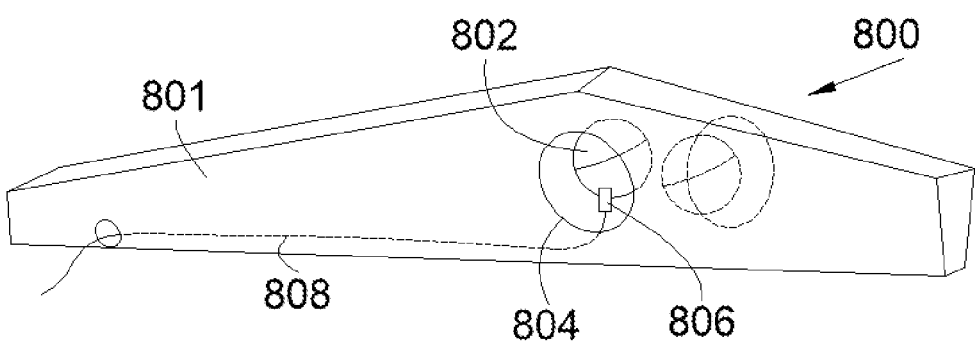
FIG. 5 is a perspective view of an assembly of the prior art.

FIGS. 2 to 4 show an assembly 50 according to the invention, which has the pylon 12 and at least one reservoir 102*a-b*. In the embodiment of the invention presented here, there are two reservoirs 102*a-b*, but the invention applies in the same way for a single reservoir 102*a-b*. In the rest of the description, unless specified otherwise, reference is made to a single reservoir 102*a*.

The pylon 12 conventionally extends along the longitudinal direction X and has a structure made up of a chassis 12*a* and walls 12*b* fastened around the chassis 12*a*. The pylon 12 is symmetrical overall with respect to a vertical median plane XZ of the pylon 12 which passes through the axis of the engine 14. The pylon 12 takes the form of a box which has, among other things, a lower wall 12*c*, an upper wall 12*d*, and two side walls 12*b*, which are vertical and extend on either side of the vertical medial plane XZ of the pylon 12.

In this instance, the chassis 12*a* is made up of multiple profiled elements 104 which are fastened to one another and to which the walls 12*b-d* are fastened.

The two side walls 12*b* are thus fastened on either side of the chassis 12*a* in planes which are generally vertical and parallel to the median plane.

As FIGS. 2 and 3 show, each profiled element 104 in this case takes the form of an arch which extends in a plane generally perpendicular to the longitudinal direction X and has two posts 104*a-b* which are oriented vertically and disposed on either side of the median plane XZ. The posts 104*a-b* are thus spaced apart from one another so as to leave the passage between them free for the reservoir 102*a*. In general, the chassis 12*a* is open to allow the passage of the reservoir 102*a* between the elements making up said chassis 12*a*.

Each side wall 12*b* has an aperture 18 (visible in the background in FIG. 2), which makes it possible to access the interior of the pylon 12 and the chassis 12*a* from the outside of the pylon 12, and the aperture 18 is dimensioned to allow the passage of the reservoir 102*a*. The two apertures 18 are disposed facing one another with respect to the median plane XZ.

As shown in FIG. 4, the reservoir 102*a* is equipped with fastening means 106 which are disposed on either side of the median plane XZ when the reservoir 102*a* is in place. As explained below, when the reservoir 102*a* is placed in the pylon 12 through the aperture 18, the fastening means 106 are accessible from each aperture 18. The fastening means 106 are tabs in this case and they interact with fastening elements 108 to ensure the fastening of the reservoir 102*a* inside the pylon 12 when the reservoir 102*a* is in place.

The assembly 50 also has a support 111*a-b* which is mounted inside the chassis 12*a*, in this case between two neighboring arches. Of course, if there are multiple reservoirs 102*a-b*, there is one support 111*a-b* per reservoir 102*a-b*.

In the embodiment of the invention presented in FIGS. 2 to 4, the support 111*a-b* has two support elements 110*a-b*, in this case each extending parallel to the longitudinal direction X. Each support element 110*a-b* in this case has an upwardly facing first bearing face 113 and each fastening means 106 bears against a first bearing face 113 via a downwardly facing second bearing face of said fastening means. As a result, when the reservoir 102*a-b* is in place on the support element 110*a-b*, each second bearing face bears against a first bearing face 113.

The fastening elements 108 ensure the fastening of the fastening means 106 of the reservoir 102*a* to a support element 110*a-b* and each takes the form, for example, of a screw which is screwed into the support element 110*a-b* in a bore provided for this, passing through the fastening means 106.

The support 111*a-b* is offset along the longitudinal direction X with respect to the apertures 18 and, as shown in FIG. 2, one support 111*a* is towards the front with respect to the apertures 18 and one support 111*b* is at the rear with respect to the apertures 18. It is thus possible to dispose one reservoir 102*a* at the front of the apertures 18 and one at the rear.

Each support element 110*a-b* has a proximal end 112*a*, which is at the apertures 18, and a distal end 112*b*, which is on the opposite side to said apertures 18. Thus, the support 111*a* has its proximal ends 112*a* towards the rear and its distal ends 112*b* towards the front, and the support 111*b* has its proximal ends 112*a* towards the front and its distal ends 112*b* towards the rear.

Each proximal end 112*a* is fastened to the chassis 12*a*, in this case to one of the two posts 104*a-b* making up a profiled element 104, by at least one first fastening means 114 which ensures removable fastening of the proximal end 112*a* to the chassis 12*a*.

In the embodiment of the invention presented in FIG. 2, there are two first fastening means 114 per proximal end 112*a* to ensure redundancy, and in this case each is a bolt having a first nut 114*a* fastened to the chassis 12*a* and a first clamping screw 114*b* which is screwed in the first nut 114*a* through a first bore 114*c* in the support element 110*a-b*. The screw head of each first clamping screw 114*b* is accessible from the inside of the chassis 12*a* between the support elements 110*a-b* such that the operator is not hindered by the side walls 12*b*. The heads of the first clamping screws 114*b* of one support element 110*a-b* thus face the heads of the first clamping screws 114*b* of the other support element 110*b-a*.

Each distal end 112*b* is mounted on the chassis 12*a* rotatably about a horizontal axis of rotation 60 perpendicular to the longitudinal direction X. Each support element 110*a-b* is thus rotatable alternately between a use position (FIG. 2), in which the associated first bearing face 113 is horizontal and in which the support element 110*a-b* is fastened by the first fastening means 114, and a fitted position (FIG. 3), in which the first bearing face 113 is tilted downwards and in which the support element 110*a-b* is not fastened by the first fastening means 114.

As a result, when a reservoir 102*a-b* must be fitted, each first fastening means 114 is removed, so as to enable the rotation of each support element 110*a-b* which, owing to its weight, pivots downwards about the axis of rotation 60, as shown by the arrow 62, to reach the fitted position. In this position, the first bearing face 113, that is to say the top of the support element 110*a-b*, faces the apertures 18, thereby making it easier to fit the reservoir 102*a-b* on the support elements 110*a-b*, and more particularly the first bearing faces 113, and to fit the fastening elements 108 on the fastening means 106. Each support element 110*a-b* can then be lifted up in its use position, that is to say with the first bearing face 113 in the horizontal position (in the opposite direction to the arrow 62), and each first fastening means 114 is refitted to fix the support element 110*a-b* in place.

A reservoir 102*a-b* is removed in the same way.

It is thus easier to access the fastening elements 108 and the first fastening means 114, thereby limiting the risks for an operator installing a heavy and bulky reservoir 102*a-b*.

To limit the downward rotation of each support element 110*a-b* and maintain the fitted position, the assembly 50 has, for each support element 110*a-b*, a stop 120 against which the support element 110*a-b* bears in the fitted position. In the embodiment of the invention presented here, it is the proximal end 112*a* of the support element 110*a-b* which bears against the stop 120, in this case via a tongue in which the first bores 114*c* of the first fastening means 114 are made.

In the embodiment of the invention presented in FIG. 3, the stop 120 takes the form of a flange of a fitting 122 integral with the chassis 12*a*, in this case a post 104*a-b*, wherein the fitting 122 also bears the first nuts 114*a* of the first fastening means 114 in this case.

According to a particular embodiment, each stop 120 is disposed such that, in the fitted position, the first bearing face 113 is angled 200 downwards with respect to the horizontal.

In the embodiment of the invention presented in FIGS. 2 and 3, the rotation of each support element 110*a-b* is performed by fitting, at the distal end 112*b* of each support element 110*a-b*, a second fastening means 126 that takes the form of a bolt having a second screw 126*a* fastened to the chassis 12*a*, and a second clamping screw 126*b* which is screwed in the second nut 126*a* through a second bore in the support element 110*a-b*. The screw head of each second clamping screw 126*b* is also accessible from the inside of the chassis 12*a* between the support elements 110*a-b*.

In the use position, the second clamping screw 126*b* is tightened to contribute to the retention of the support element 110*a-b* and, in the fitted position, the second clamping screw 126*b* is loosened but it remains engaged with the second nut 126*a* so as to form a shaft about which the support element 110*a-b* pivots.

To ensure redundancy in the fastening of the distal end 112*b*, the assembly 50 has, at the distal end 112*b* of each support element 110*a-b*, a first fastening means 114, that is to say, in this case, a bolt with a first nut 114*a* fastened to the chassis 12*a* and a first clamping screw 114*b* which is screwed in the first nut 114*a* through a first bore 114*c* in the associated support element 110*a-b*. The first clamping screw 114*b* is unscrewed entirely so that it can be removed to allow the support element 110*a-b* to rotate.

For better access in the fitted position, in the embodiment of the invention presented in FIG. 3, at the distal end 112*b*, the first fastening means 114 is disposed below the second fastening means 126.

To ensure the retention of the reservoir 102*a* on the support elements 110*a-b* in the fitted position and avoid the fastening means 106 shifting along the first bearing faces 113 owing to the angle of inclination, each first bearing face 113 is equipped with at least one step 130. When the reservoir 102 is being fitted, it is fitted in such a way that, on each first bearing face 113, a fastening means 106 is located at the rear of a step 130 in relation to the descending direction of the first bearing face 113 in the fitted position, so as to be blocked by said step.

In the embodiment of the invention presented in FIGS. 3 and 4, each support element 110*a-b* has a lower beam 115*a* which has the first bores 114*c* and the second bore and an upper beam 115*b* which is fastened to the lower beam 115*a* via spacers and has the first bearing face 113.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft, said assembly comprising:
a pylon extending along a longitudinal direction and having a chassis and two side walls disposed on either side of the chassis, each provided with an aperture, and,
at least one reservoir, which has fastening means and is configured to contain an extinguishing agent,
for each reservoir, a support which has two support elements and is offset along the longitudinal direction with respect to said apertures, wherein each support element has an upwardly facing first bearing face against which the fastening means bear, wherein each support element has a proximal end at said apertures and a distal end on an opposite side to said apertures, wherein each proximal end is fastened to the chassis by at least one first fastening means which is configured to provide removable fastening of said proximal end, wherein each distal end is mounted on the chassis rotatably about a horizontal axis of rotation perpendicular to the longitudinal direction, and wherein each support element is configured to be moved between a use position, in which the associated first bearing face is horizontal, and a fitted position, in which the associated first bearing face is tilted downwards, for each reservoir and for each support element, fastening elements which fasten the fastening means of said reservoir to said support element.

2. The assembly according to claim 1, further comprising, for each support element, a stop against which said support element bears in the fitted position.

3. The assembly according to claim 1, wherein each first bearing face comprises at least one step arranged such that, in the fitted position, a fastening means is located to the rear of a step in relation to a descending direction of the first bearing face.

4. The assembly according to claim 1, wherein each first fastening means, at the proximal end, comprises a bolt having a first nut fastened to the chassis and a first clamping screw which is screwed in the first nut through a first bore in the associated support element.

5. An aircraft comprising:
the assembly according to claim 1.

6. The assembly according to claim 4, wherein a screw head of each first clamping screw is configured to be accessed from an inside of the chassis between the two support elements.

7. The assembly according to claim 1, wherein each support element is configured to be rotated by a fitting of a second fastening means which comprises, at the distal end, a bolt having a second nut fastened to the chassis and a second clamping screw screwed in the second nut through a second bore in said support element.

8. The assembly according to claim 7, wherein in that a screw head of each second clamping screw is accessible from an inside of the chassis between the two support elements.

9. The assembly according to claim 7, further comprising, at the distal end of each support element, a first fastening means having a bolt with a first nut fastened to the chassis and a first clamping screw which is screwed in the first nut through a first bore in the associated support element.

10. The assembly according to claim 9, wherein, at each distal end, the first fastening means is disposed below the second fastening means.

* * * * *